UNITED STATES PATENT OFFICE.

JOHN C. FLEMING, OF BOSTON, MASSACHUSETTS.

FOOD PRODUCT AND PROCESS OF PRODUCING THE SAME.

1,174,404.

Specification of Letters Patent.   Patented Mar. 7, 1916.

No Drawing.   Application filed November 9, 1915.   Serial No. 60,590.

*To all whom it may concern:*

Be it known that I, JOHN C. FLEMING, a citizen of the United States, residing at Boston, in the county of Suffolk and State of Massachusetts, have invented new and useful Improvements in Food Products and Processes of Producing the Same, of which the following is a specification.

This invention is a food product, and a process for producing and preserving the same.

One of the objects of the invention is to produce a food product containing the active and useful properties of fruit juices.

A further object is to provide a food of this character in which the fruit properties may be indefinitely retained, without danger of fermentation.

A further object is to provide a food product, which may be employed for the manufacture of biscuit of the character described and claimed in Letters Patent 761,666, June 7, 1904, but it is not limited in this particular, as it may be used for various other forms of cooked foods.

In carrying out the process, the juice is extracted from the fruit by pressure, or in any other suitable or desired manner. The extracted juice is then mixed with any desired cereal product, preferably malt, in powdered form, the mixing operation being accomplished by means of any suitable mixing mechanism. The mixture thus produced is then placed into a suitable vessel, where it is subjected to heat, preferably under vacuum, to extract the moisture therefrom so as to render the same substantially anhydrous. During this treatment the temperature is kept comparatively low to avoid chemical change of the fruit juice, and yet drive off sufficient moisture to prevent fermentation of the finished product. As a final precaution, it is preferred to subject the mixture, after the vacuum treatment, to a further drying process, preferably under cover of animal charcoal between wire screens, a low heat being applied. The charcoal acts to extract the moisture and protects the product from the oxygen of the air. The final product is in the form of a fruit flour, which may be stored in barrels or other receptacles, in a manner similar to wheat flour, and which will keep indefinitely, if not exposed to the atmosphere. The fruit flour thus obtained may be made into a dough, or mixed with a dough composed of wheat flour or any other cereal, shaped to any desired form, and then baked in an oven in the usual way.

It is well known that malic acid is the active principle of the juice of apples, and that it is very desirable to preserve the same in an unfermented state. The attainment of this result is rendered possible by the process herein described. In this connection, however, it will be understood that the invention is not limited solely to the treatment of apple juice, but is equally applicable to the treatment and preservation of the active properties of various other fruit juices. In other words, a food product is provided, containing fruit juices bearing the intrinsic merit of the fruit, without the fibrous portion, thereby producing a very palatable and beneficial food, free of substances which will tend to injure or seriously tax the stomach.

I claim as my invention:—

1. The process of treating fruit juices to preserve the same comprising separating the juices from the pulp of the fruit, mixing the fresh juices while in their natural condition with a powdered cereal, and drying the mixture to produce a fruit flour.

2. The process of treating fruit juices to preserve the same comprising separating the juices from the pulp of the fruit, mixing the fresh juices while in their natural condition with a powdered cereal, and then subjecting the same to a mild heat to separate the moisture therefrom without chemical change, to form a fruit flour.

3. The process of treating fruit juices to preserve the same comprising mixing the fresh juices with powdered malt, and drying the mixture to produce a fruit flour.

4. The process of treating juices of fruits containing malic acid to preserve the same comprising mixing the fresh juices with a powdered cereal and then subjecting the same to a mild heat to separate the moisture therefrom without chemical change, and finally drying the mixture under cover of animal charcoal, to form a malic flour.

5. The process of treating fruit juices to preserve the same comprising mixing the fresh juices with powdered malt, and then subjecting the same to mild heat, to separate the moisture therefrom without chemical change, and finally drying the mixture under the protection of an absorbent.

6. A food product comprising a dried and powdered mixture of a cereal and the juice of fruit containing malic acid.

7. A food product comprising a dried mixture of fruit juice and powdered malt.

In testimony whereof I have hereunto set my hand.

JOHN C. FLEMING.